United States Patent [19]

Schweickert

[11] Patent Number: 4,979,776
[45] Date of Patent: Dec. 25, 1990

[54] FABRIC COVER AND TIE DOWN SYSTEM FOR PICK-UP TRUCKS

[76] Inventor: David J. Schweickert, 29 W. Summit Dr., Redwood City, Calif. 94062

[21] Appl. No.: 471,495

[22] Filed: Jan. 29, 1990

[51] Int. Cl.⁵ .............................................. B60P 7/02
[52] U.S. Cl. .................................... 296/100; 410/110
[58] Field of Search ................ 410/97, 99, 101, 108, 410/110, 115; 296/24.1, 37.6, 39, 100, 136; 114/361; 150/166; 105/377

[56] References Cited

U.S. PATENT DOCUMENTS

| | | | |
|---|---|---|---|
| 4,253,785 | 3/1981 | Bronstein | 410/100 |
| 4,739,528 | 4/1988 | Allen | 296/100 |
| 4,795,207 | 1/1989 | Clarke | 150/166 |
| 4,838,602 | 6/1989 | Nett | 296/100 |
| 4,848,824 | 7/1989 | Smith et al. | 296/37.6 |

Primary Examiner—Robert J. Spar
Assistant Examiner—Craig Slavin

[57] ABSTRACT

Tie-down devices are affixed to one piece members to be installed on the exterior of a pick-up truck bed. The side and rear members will also serve as rail protectors. A fabric (tonneau) cover is attached to the tie-down devices.

1 Claim, 3 Drawing Sheets

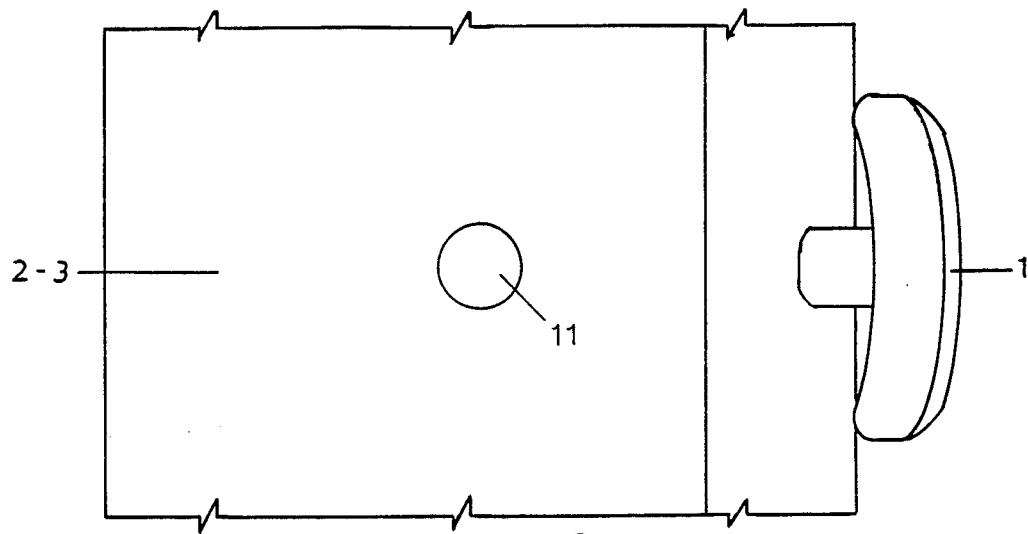
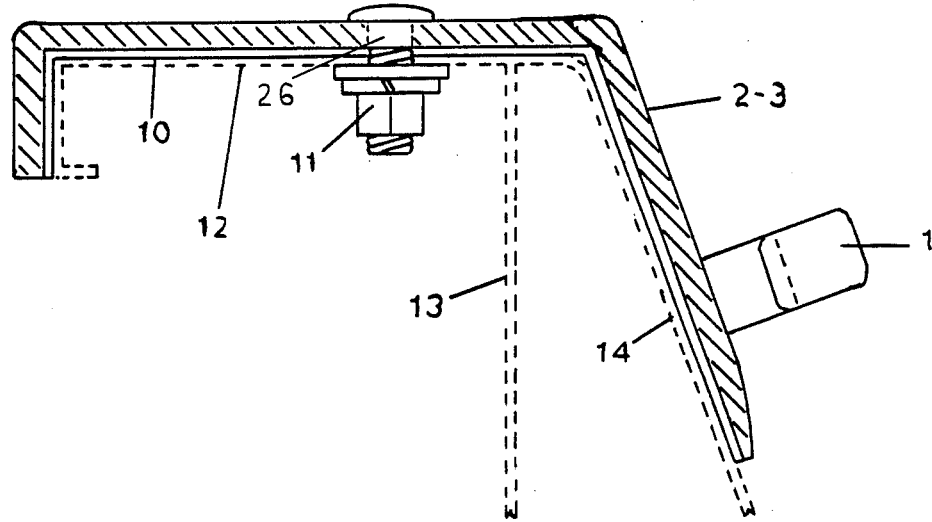
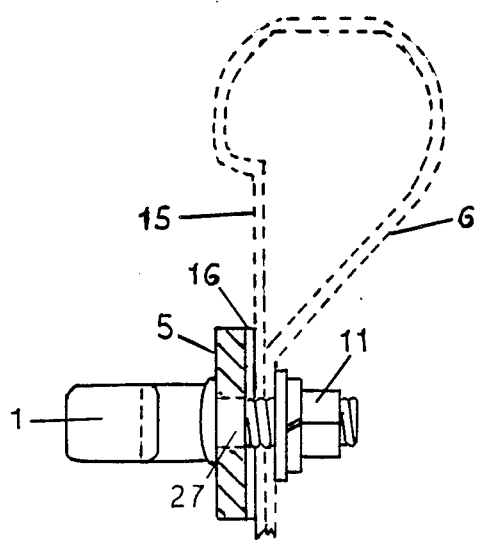
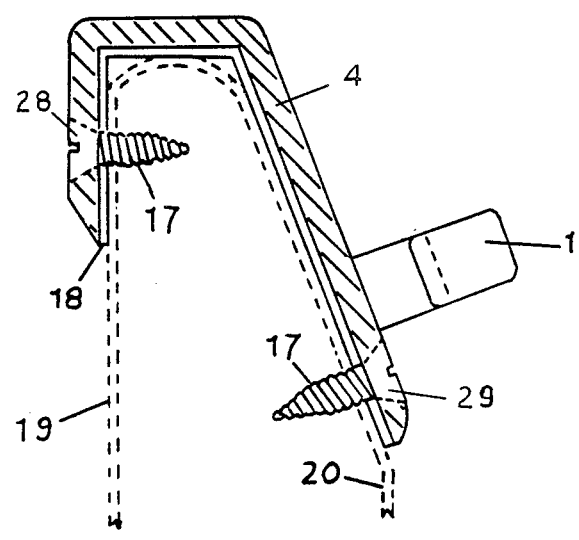

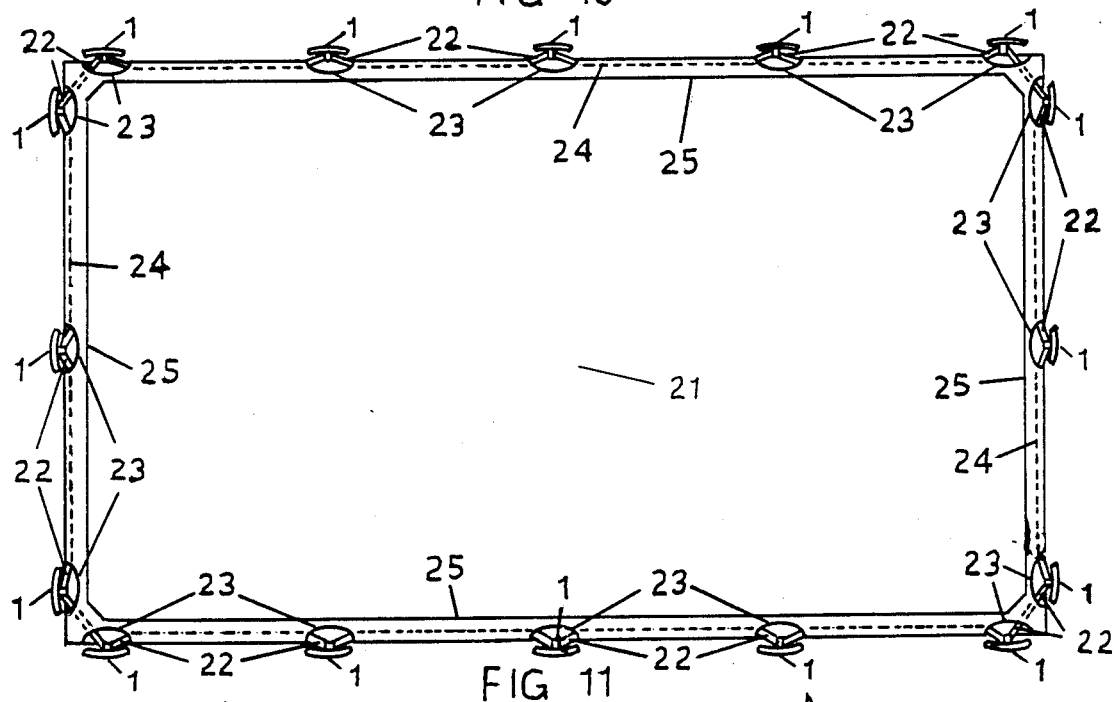
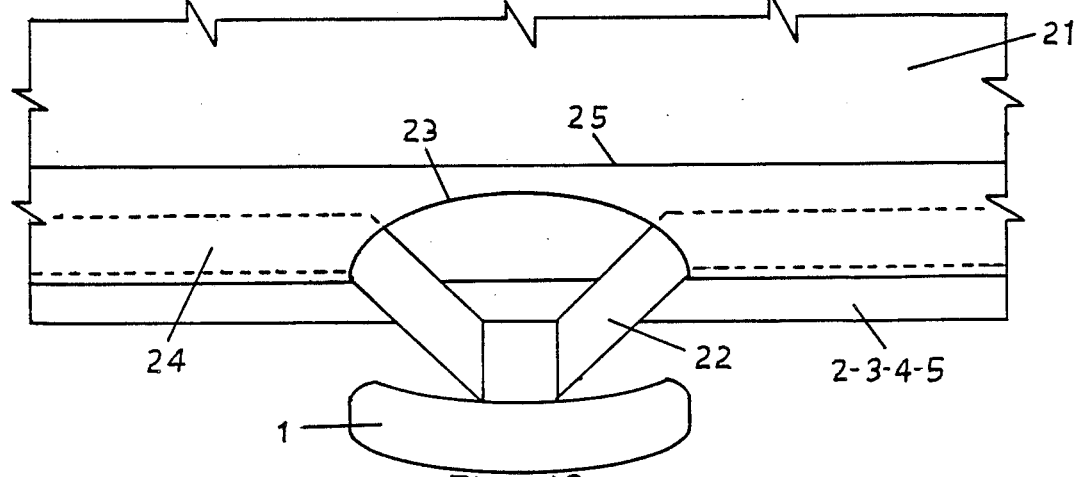
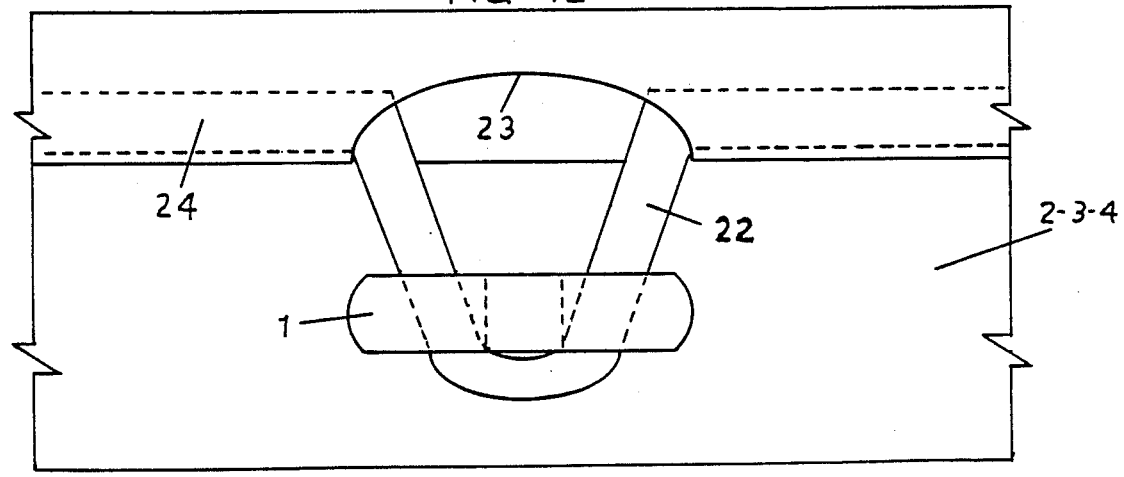

FABRIC COVER AND TIE DOWN SYSTEM FOR PICK-UP TRUCKS

BACKGROUND OF THE INVENTION

1. Field of the Invention

This invention relates to a device to be installed on the top rail portion of a pick-up truck bed to protect the rail and provide tie-down devices to secure a specifically made fabric (tonneau) cover which attaches to the tie-down devices.

2. Description of the Prior Art

Currently most pick-up trucks, new and old, do not have tie-down devices installed on their cargo beds. The reason for this is mainly due to the bed's double-wall construction, which makes a strong and firm installation a very difficult task.

Currently installing a fabric (tonneau) cover to a pick-up truck bed is a complicated and time consuming task.

SUMMARY OF THE INVENTION

The present invention overcomes the problems of the prior art by providing an easily installed system for covering the bed of a truck which includes tie down devices and a fabric cover.

BRIEF DESCRIPTION OF THE DRAWINGS

FIG. 6 is a plan view of a portion of the right or left rail protector with the affixed tie-down device FIG. 7 is a sectional view along section 7—7 of FIG. 1.

FIG. 8 is a sectional view, along section 8—8 of FIG. 1.

FIG. 9 is a sectional view along section 9—9 of FIG. 1. FIG. 10 is a plan view of the fabric (tonneau) cover attached to the tie-down devices.

FIG. 11 is a plan view of a portion of the fabric (tonneau) cover attached to a tie down device.

FIG. 12 is an elevation of a portion of the fabric (tonneau) cover attached to a tie-down device.

DESCRIPTION OF THE PREFERRED EMBODIMENT

Figure 1:
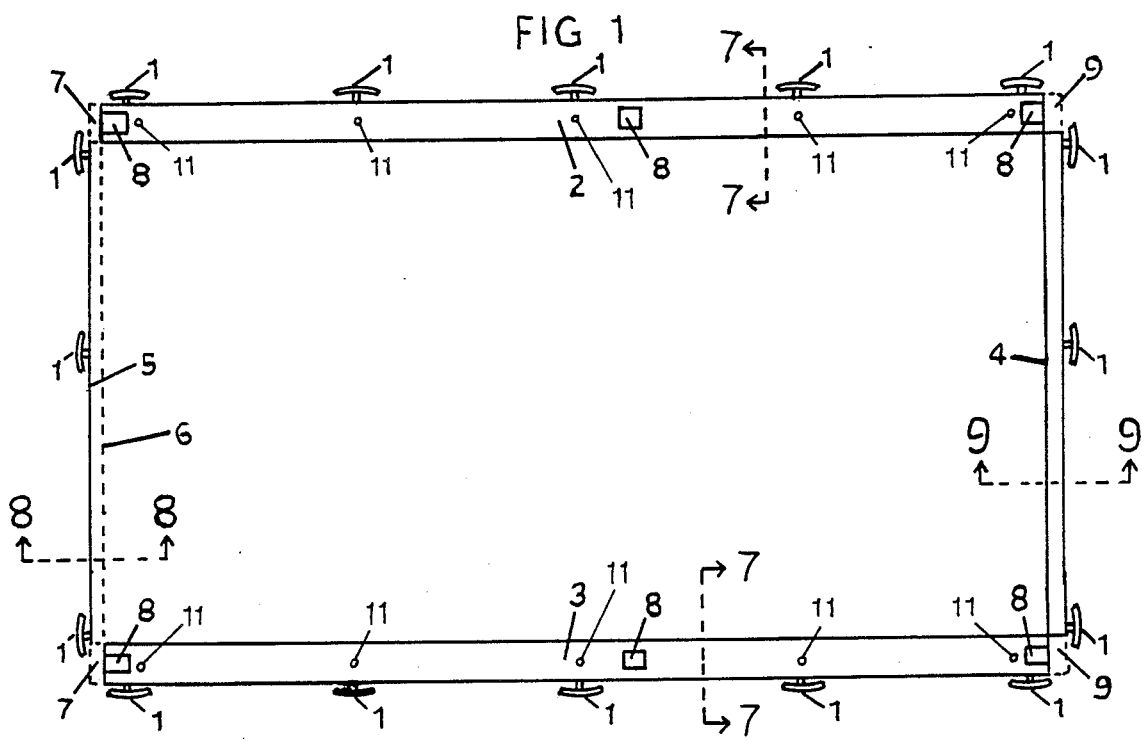
FIG. 1 is a plan view of the tie-down system.
Figure 2:
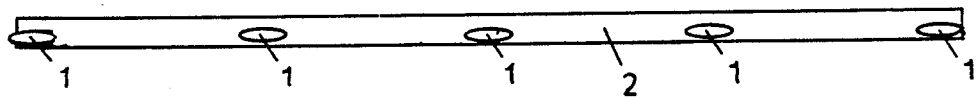
FIG. 2 is a right side elevation of the rail protector and its affixed tie-down devices.
Figure 3:
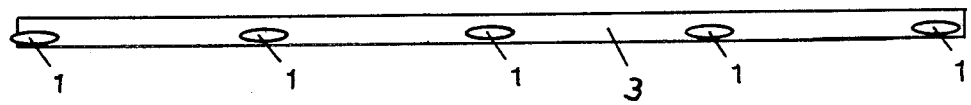
FIG. 3 is a left side elevation of the rail protector and its affixed tie-down devices.
Figure 4:
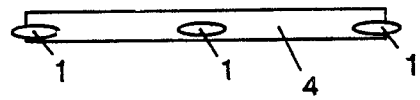
FIG. 4 is a rear elevation of the rail protector and its affixed tie-down devices.
Figure 5:
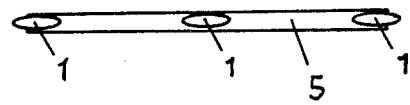
FIG. 5 is a front elevation of a metal strip and its affixed tie-down devices.

Referring to FIGS. 1, 2, 3, 4, 5, 6, 7, 8, and 9 an embodiment of a fabric cover and tie-down system is shown. In this embodiment tie-down devices are comprised of hooks 1 affixed to mounting members 2, 3 and 4 which serve as rail protectors, and strip of metal 5 and are mounted to the top portion of a pick-up truck bed. Cut outs 8 are provided in mounting members 2 and 3 to allow use of post holes in side rails of truck bed. The interior bed front rail is 6. The exterior exposed top corners of truck bed are: front 7 and rear 9. The side mounting members 2 and 3 with hooks 1 affixed thereto are mounted with nut and bolt assembly 11 (carriage bolts, flat washers, lock washers, and nuts) through holes 26 that are precut in mounting members 2 and 3 by manufacturer and drilled in top rail of truck bed by installer. There is a neoprene gasket 10 in between mounting members 2 and 3 and the top of the trucks rail 12 and its exterior side wall 14. The truck's bed interior side wall is 13.

The strip of metal 5 with hooks 1 affixed thereto is mounted to truck's front exterior top portion of bed 15 with nut and bolt assembly 11 (carriage bolts, flat washers, lock washers, and nuts) through holes 27 that are precut in the metal strip 5 by manufacturer and drilled in front wall of truck bed by installer. There is a neoprene gasket 16 in between the strip 5 and the truck's exterior.

The rear (tailgate) protector 4 with hooks 1 affixed thereto is mounted with sheet metal screws 17 through holes 28 and 29 pre-drilled by manufacturer and drilled in top portion of tailgate by installer. There is a neoprene gasket 18 in between protector 4 and truck's top portion of tailgate. The interior of tailgate is 19 and the exterior is 20.

Referring to FIGS. 10, 11 and 12 an embodiment of fabric (tonneau) cover is shown. In this embodiment the fabric (tonneau) cover 21 is attached to the tie-down system shown in FIG. 1.

There is a round elastic band 24 inside a hem 25 sewn on the outside perimeter of cover 21. Cut-outs 23 are in the hem 25 to expose the elastic band 24 adjacent to each tie-down device 1 which secures the cover 21 to the top of a pick-up truck bed.

I claim:

1. A system for covering a truck bed having side walls, a forward wall and a rear tailgate, wherein said forward wall has an upper portion, said side walls have an upper portion including an inner wall, an outer wall and a top, and said tailgate has an upper portion including an inner wall, an outer wall and a top when it is in the upper, closed position, comprising:
   a fabric cover having a shape corresponding to that of said truck bed when said tailgate is in the upper, closed position and a hem extending around the perimeter of said cover;
   an elastic band extending around the perimeter of said cover and contained within said hem;
   a plurality of cut-outs along said hem for exposing said band and allowing access thereto;
   a plurality of tie down devices fixedly attached to said truck bed for attaching said cover to said truck bed;
   one of said tie down devices being removably secured to the upper portion of each of said side walls, forward wall and tailgate;
   each of said tie down devices for said tailgate and side walls comprising mounting members that protect, and are attached to the upper portion of said tailgate and side walls, said mounting members comprising a horizontal upper portion corresponding to the respective tops of the tailgate or side wall to which it is to be secured and downwardly projecting portions overlaying corresponding portions of the respective tailgate and side walls;

said tie down device for said forward wall comprising an elongated mounting strip secured to the upper portion of said forward wall;

each said tie down device having a plurality of spaced apart hook means, the hook means being positioned so as to correspond to the location of said cutouts in said hem of said cover whereby said cover may be secured to said truck so as to cover said bed by hooking said elastic band over corresponding hook means.

* * * * *